United States Patent
Buecherl et al.

(10) Patent No.: US 11,144,304 B2
(45) Date of Patent: Oct. 12, 2021

(54) METHOD AND CENTRAL DATA PROCESSING DEVICE FOR UPDATING SOFTWARE IN A PLURALITY OF VEHICLES

(71) Applicant: Bayerische Motoren Werke Aktiengesellschaft, Munich (DE)

(72) Inventors: Gunther Buecherl, Olching (DE); Philipp Rammerstorfer, Feldkirchen (DE); Michael Spiegler, Grosskarolinenfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 72 days.

(21) Appl. No.: 16/804,156

(22) Filed: Feb. 28, 2020

(65) Prior Publication Data

US 2020/0201621 A1 Jun. 25, 2020

Related U.S. Application Data

(63) Continuation of application No. PCT/EP2018/065293, filed on Jun. 11, 2018.

(30) Foreign Application Priority Data

Oct. 5, 2017 (DE) ..................... 10 2017 217 668.7

(51) Int. Cl.
*G06F 9/44* (2018.01)
*G06F 8/65* (2018.01)
*G07C 5/00* (2006.01)

(52) U.S. Cl.
CPC ............... *G06F 8/65* (2013.01); *G07C 5/008* (2013.01)

(58) Field of Classification Search
CPC ....................................................... G06F 9/44
See application file for complete search history.

(56) References Cited

U.S. PATENT DOCUMENTS

| 5,792,212 A * | 8/1998 | Weijand | A61B 5/24 607/73 |
| 2004/0181787 A1* | 9/2004 | Wickham | G06F 8/65 717/168 |

(Continued)

FOREIGN PATENT DOCUMENTS

| DE | 101 31 395 A1 | 1/2003 |
| DE | 10 2005 013 281 A1 | 10/2005 |

(Continued)

OTHER PUBLICATIONS

International Search Report (PCT/ISA/210) issued in PCT Application No. PCT/EP2018/065293 dated Sep. 12, 2018 with English translation (five (5) pages).

(Continued)

*Primary Examiner* — Jae U Jeon
(74) *Attorney, Agent, or Firm* — Crowell & Moring LLP

(57) ABSTRACT

A method and a central data processing device updates software in a plurality of vehicles of a vehicle fleet during a software rollout. Vehicles of the vehicle fleet are registered in a central data processing device by transmitting vehicle identification data of the vehicles to the central data processing device via an air interface when a vehicle connects to the central data processing device for the first time. Additionally, a check is continuously carried out in order to determine whether a trigger signal is present that is suitable for initiating an update of the software in at least one of the plurality of vehicles of the vehicle fleet. At least one vehicle registered in the central data processing device is selected from the plurality of vehicles in the vehicle fleet using the vehicle identification data transmitted to the central data (Continued)

processing device when a trigger signal is ascertained and a software update is available. The software update is transmitted from the central data processing device to the at least one selected vehicle via the air interface.

11 Claims, 2 Drawing Sheets

(56) References Cited

U.S. PATENT DOCUMENTS

| | | |
|---|---|---|
| 2005/0216903 A1 | 9/2005 | Schaefer |
| 2009/0300595 A1 | 12/2009 | Moran et al. |
| 2011/0307336 A1 | 12/2011 | Smirnov et al. |
| 2015/0286475 A1* | 10/2015 | Vangelov ................. G06F 8/71 717/170 |
| 2015/0319511 A1* | 11/2015 | Droste .................... H04Q 9/00 340/870.07 |
| 2015/0339114 A1 | 11/2015 | Rockwell et al. |
| 2016/0259639 A1 | 9/2016 | Blaschke et al. |
| 2018/0063285 A1 | 3/2018 | Nordbruch |
| 2018/0189049 A1* | 7/2018 | Madrid ................... G06F 21/78 |
| 2019/0187971 A1* | 6/2019 | Wang ..................... H04W 12/04 |
| 2019/0332107 A1* | 10/2019 | Shimizu ................. H04W 4/44 |

FOREIGN PATENT DOCUMENTS

| | | |
|---|---|---|
| DE | 10 2008 001 080 A1 | 10/2009 |
| DE | 10 2009 018 761 A1 | 10/2010 |
| DE | 10 2015 107 189 A1 | 11/2015 |
| DE | 10 2015 015 428 A1 | 5/2016 |
| DE | 10 2015 203 766 A1 | 9/2016 |
| DE | 10 2015 204 363 A1 | 9/2016 |

OTHER PUBLICATIONS

German-language Written Opinion (PCT/ISA/237) issued in PCT Application No. PCT/EP2018/065293 dated Sep. 12, 2018 (eight (8) pages).

German-language Search Report issued in counterpart German Application No. 102017217668.7 dated Mar. 13, 2018 with English translation (15 pages).

* cited by examiner

METHOD AND CENTRAL DATA PROCESSING DEVICE FOR UPDATING SOFTWARE IN A PLURALITY OF VEHICLES

CROSS REFERENCE TO RELATED APPLICATIONS

This application is a continuation of PCT International Application No. PCT/EP2018/065293, filed Jun. 11, 2018, which claims priority under 35 U.S.C. § 119 from German Patent Application No. 10 2017 217 668.7, filed Oct. 5, 2017, the entire disclosures of which are herein expressly incorporated by reference.

BACKGROUND AND SUMMARY OF THE INVENTION

The invention concerns a method and a central data processing device for updating software in a plurality of vehicles, in particular motor vehicles, of a vehicle fleet during a software rollout. The invention further concerns a vehicle of the vehicle fleet.

For the operation of modern vehicles, a plurality of control units are usually used, each fulfilling different tasks in the vehicle, such as an electronic engine control or an electronic powertrain control. The control units are usually in the form of an embedded system and, depending on the task, are programmable to a greater or lesser extent. From time to time, adjustments to the programming of the control units may be necessary or desired, for example to provide additional vehicle functions or to improve existing vehicle functions.

Document DE 10 2005 013 281 A1 concerns the management of a software configuration of a vehicle, wherein software configuration update data for a vehicle are requested from a central database by a call center or a telematics unit and it is determined whether the requested software configuration update data correspond to vehicle software configuration data that are read out, and on the basis of the determination a software module is sent from the call center to the telematics unit via a wireless network.

It is an object of the invention to improve the updating of software in a plurality of vehicles of a vehicle fleet.

This object is achieved by a method and a central data processing device according to the independent claims as well as by a corresponding vehicle.

A first aspect of the invention concerns a method for updating software in a plurality of vehicles, in particular motor vehicles, of a fleet of vehicles during a software rollout with the steps: (i) registering vehicles of the vehicle fleet in a central data processing device by transmitting vehicle identification data of the vehicles via an air interface to the central data processing device when a vehicle connects to the central data processing device for the first time; (ii) continuously checking whether there is a trigger signal present that is capable of triggering an update of the software in at least one of the plurality of vehicles in the vehicle fleet; (iii) selecting at least one vehicle registered in the central data processing device from the plurality of vehicles in the vehicle fleet on the basis of the vehicle identification data transmitted to the central data processing device if a trigger signal is detected and a software update is available; and (iv) transferring the software update from the central data processing device to the at least one selected vehicle via the air interface.

A fleet of vehicles within the meaning of the invention means in particular a number of vehicles. The vehicles can be vehicles in different versions that can be updated with respect to a predetermined hardware and/or software configuration. Preferably, the vehicles of the vehicle fleet have at least one common feature, such as the same engine, the same chassis, the same equipment and/or the like. In particular, vehicles of a series form a vehicle fleet.

The software of a vehicle within the meaning of the invention is to be understood in particular to mean the programming of at least one control unit of the vehicle. Preferably, the programming is in the form of code that is executable by the control unit. In other words, the software is a computer program that is suitable for controlling at least one control unit of the vehicle.

A central data processing device shall in particular be understood to mean a device that can be connected to the vehicles of the vehicle fleet, in particular for data communication, and that is preferably set up to process and possibly to save data and/or signals. A central data processing device may be, in particular, a server that comprises at least one computing unit for carrying out computing operations on data and/or signals and a database unit for storing data and/or signals. A central data processing device is sometimes referred to as a "backend".

An air interface in the sense of the invention is to be understood in particular to mean an interface, via which the central data processing device can be wirelessly connected to the vehicles of the vehicle fleet, in particular for data communication. An air interface is preferably formed by a wireless local network (WLAN), a cellular standard such as UMTS or LTE, Bluetooth and/or the like, wherein the connection between the central data processing device and the vehicles is provided in particular by the Internet.

A software rollout within the meaning of the invention is to be understood in particular to mean the provision of new software or at least a new part of the software that can replace a corresponding part of the software. Preferably, in the case of a software rollout, a software update, i.e. a software package that updates existing software when used, in particular partially replaces the existing software, is distributed to the vehicles of the vehicle fleet, in particular with the aim of improving existing vehicle functions and/or of providing new vehicle functions.

The invention is based in particular on the approach of selecting one or more of a plurality of vehicles registered in a central data processing device that are part of a plurality of vehicles of a vehicle fleet and transmitting a software update from the central data processing device to the selected vehicles via an air interface. This operation is preferably carried out if the presence is detected of a trigger signal that is suitable to initiate the software update, and in particular the presence is detected of a software update that is suitable to update software currently being used in the at least one selected vehicle as part of an ongoing check. For this purpose, it is envisaged, in particular, to register the vehicles of the vehicle fleet in the central data processing device using vehicle identification data, such as a license plate, a vehicle serial number or another serial number, in particular by storing it in a database unit of the central data processing device, when a connection, in particular for data communication, is first made via an air interface between the vehicles and the central data processing device.

In this way, one or more vehicles registered in the central data processing device can be reliably selected on the basis of the vehicle identification data.

The selection of at least one vehicle of the vehicle fleet registered in the central data processing device as the recipient of the software update enables an efficient and robust distribution of the software update. Advantageously, the software of each of the plurality of vehicles of the vehicle fleet can be updated successively, or at least an essentially simultaneous updating of the software of all vehicles can be avoided, whereby overloading of the vehicle central data processing device or of a connection between the vehicles and the central data processing device can be avoided. In this context, the selection of at least one vehicle of the vehicle fleet registered in the central data processing device may advantageously enable the use of selection algorithms that cause a particularly uniform so-called load distribution (also known as "load-balancing").

A further advantage results from the continuous check as to whether a trigger signal is present, especially before the selection of the registered vehicles or the transfer of the software update is started. The update of the software can thus be carried out automatically and/or particularly flexibly. It is contemplated, for example, that the trigger signal is generated by vehicles of the vehicle fleet when required and/or if possible, for example automatically, and may be provided to the central data processing device, in particular via the air interface. Alternatively or additionally, it is also conceivable that the trigger signal is generated by the vehicle manufacturer, a workshop and/or the user of one of the vehicles from the vehicle fleet and may be provided to the central data processing device via the air interface or another interface.

The trigger signal can be generated or provided in particular by the central data processing device, in particular by a computing unit, preferably automatically, for example when the vehicle manufacturer provides a software update for a rollout.

Overall, the invention allows the updating of software of a plurality of vehicles of a vehicle fleet to be improved.

In a preferred embodiment, the method also comprises the following step: checking whether a user of the at least one selected vehicle has consented to the software update. Preferably, the software update is transferred from the central data processing device to the at least one selected vehicle via the air interface and/or the software of the at least one selected vehicle is updated by the transmitted software update if the user of the selected vehicle consents to the software update.

As a result, it can be avoided that a software update, which for example changes a vehicle function in a way that the user perceives negatively or which costs the user, can be performed against the user's will.

In a further preferred embodiment, the trigger signal is generated at regular time intervals by each vehicle of the vehicle fleet. Preferably, the trigger signal generated in this way is additionally suitable to clearly identify the respective vehicle, in particular from the plurality of vehicles of the vehicle fleet. For this purpose, the trigger signal may in particular contain or form the vehicle identification data. Advantageously, as a result precisely those vehicles of the vehicle fleet that have currently generated the trigger signal can be selected from the vehicles registered in the central data processing device for the software update, for example by comparing the trigger signal, in particular the vehicle identification data contained therein, with the vehicle identification data stored in the central data processing device, in particular the database unit, during the registration.

The regular time intervals are preferably between 10 and 60 days, preferably between 20 and 45 days, in particular between 25 and 35 days. As a result, a software rollout can be carried out essentially within a defined period of time, wherein no user of a vehicle of the vehicle fleet has to do without the software update or the new or improved vehicle functions beyond this period of time.

The generation of the trigger signal by the vehicles of the vehicle fleet enables the coordination of on-board components that are used for a software update, such as vehicle control units and backend components, such as the computing unit and/or or the database unit or the reliable interaction thereof.

In a further preferred embodiment, the trigger signal generated by a vehicle of the vehicle fleet is generated for the first time at a randomly determined time within a predetermined time period. The trigger signal may preferably be generated for the first time after manufacture, in particular assembly, of the vehicle, after delivery to or first commissioning by the user of the vehicle or after a software update has been completed. The predetermined duration is preferably between 10 and 60 days, preferably between 20 and 45 days, in particular between 25 and 35 days. The operating time of the vehicles with software that is not current can thus be advantageously shortened.

By randomly selecting a time at which to generate the trigger signal within the specified duration, the load distribution of the update of the software of the plurality of vehicles of the vehicle fleet can be optimized. In other words, overloading of the connection between the vehicles of the vehicle fleet and the central data processing device and/or of the central data processing device itself, in particular the computing unit and/or the database unit, can be avoided and a robust update of the software can be brought about.

In a further preferred embodiment, the at least one vehicle of the vehicle fleet is registered in the central data processing device on the basis of the respective trigger signal generated for the first time by the at least one vehicle. For this purpose, the trigger signal preferably contains or is formed by the vehicle identification data. As a result, the registration process can be carried out efficiently and without additional load on the data communication link between the vehicles of the vehicle fleet and the central data processing device.

In a further preferred embodiment, the generation of the trigger signal is effected by a user of a vehicle of the vehicle fleet. This may be advantageous if the user has available or is provided with information about a new software update that is present in the central data processing device or provided by the vehicle manufacturer, since the software update can then be carried out immediately. In particular, this allows the user to initiate the update of the software of the vehicle at a convenient time for him, for example when the vehicle is not in operation.

In another preferred embodiment, the vehicle of the user that causes the generation of the trigger signal is selected from the vehicles registered in the central data processing device. Preferably, in this case the transfer of software updates from the central data processing device to other vehicles of the vehicle fleet deferred until after the transfer of the software update from the central data processing device to the selected vehicle of the user. In other words, software updates initiated by the user will be prioritized in a preferred manner over automatically and/or routinely initiated software updates. This enables substantially uniform load distribution of the connection between the vehicles of the vehicle fleet and the central data processing device or enables overloading of the central data processing device itself to be avoided. In addition, a timely update of the software of the user's vehicle to deliver on the user's request for an update is made possible, so that the user may be enabled to use new or improved vehicle functions that are enabled by the software updates in a timely manner.

In another preferred embodiment, the method also comprises the following step: checking whether the update of the software was successfully performed by the transferred software update. Preferably, no further trigger signal is generated in this case, in particular by the selected vehicle, and/or the selected vehicle is no longer selected in the future if the update has not been carried out successfully, at least until the update has been caught up, in particular manually. In this case, a corresponding error report can be generated in an advantageous manner, for example by the selected vehicle in which the software update failed, and the report may be able to be evaluated in a workshop and may preferably be suitable for the correction of the fault, in particular for the subsequent updating of the software of the vehicle by the software update. Thus, the generation of an additional load on the connection between the central data processing device and the vehicles of the vehicle fleet or on the central data processing device itself can be avoided.

If the cause of an unsuccessful update of the software is in the vehicle, the vehicle preferably does not generate any further trigger signals and/or does not accept any further software packages to update software from the central data processing device until the cause is corrected, for example in a workshop. If a customer, in particular the driver of the vehicle, has not consented to the update, the trigger signal is preferably not regenerated by the central data processing device for the specific update and/or trigger signals generated by the vehicle are preferably ignored by the central data processing device. In particular, a new trigger signal will only be generated as a result of an explicit customer request.

In another preferred embodiment, no further trigger signal, in particular with which the update of the currently current software will be initiated, is generated and/or the selected vehicle will no longer be selected in the future, in particular for the reception of the presently current software update, if a user of the selected vehicle does not consent to the software update, at least until another, in particular different or newer, software update is available. As a result, the implementation of a software update that causes a modification of a vehicle function that is not wanted by the user can be prevented, while further software updates, especially different or newer ones, may continue to be transferred to the selected vehicle.

Here too, the avoidance of additional load, in particular overload, is enabled on the connection between the central data processing device and the vehicles of the vehicle fleet or on the central data processing device itself.

A second aspect of the invention concerns a central data processing device for updating software in a plurality of vehicles, in particular motor vehicles, of a vehicle fleet during a software rollout, wherein the central data processing device is set up to register vehicles of the vehicle fleet when a vehicle is connected to the central data processing device for the first time by transmitting vehicle identification data of the vehicles via an air interface to the central data processing device. In addition, the central data processing device is preferably set up to continuously check whether there is a trigger signal present that is capable of triggering an update of the software in at least one of the plurality of vehicles in the vehicle fleet, and further to select at least one vehicle registered in the central data processing device from the plurality of vehicles of the vehicle fleet on the basis of the vehicle identification data transmitted to the central data processing device, if a trigger signal is detected and a software update is available. The software update can then be transmitted from the central data processing device to the at least one selected vehicle via the air interface.

A third aspect of the invention concerns a vehicle, in particular a motor vehicle, that is part of a fleet of vehicles consisting of a plurality of vehicles and that is equipped to provide a trigger signal capable of triggering an update of the software of the vehicle and to transmit the trigger signal to a central data processing device according to the second aspect of the invention.

The features and advantages described in relation to the first aspect of the invention and the advantageous embodiment thereof also apply to the second and third aspects of the invention and the advantageous embodiment thereof and vice versa.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
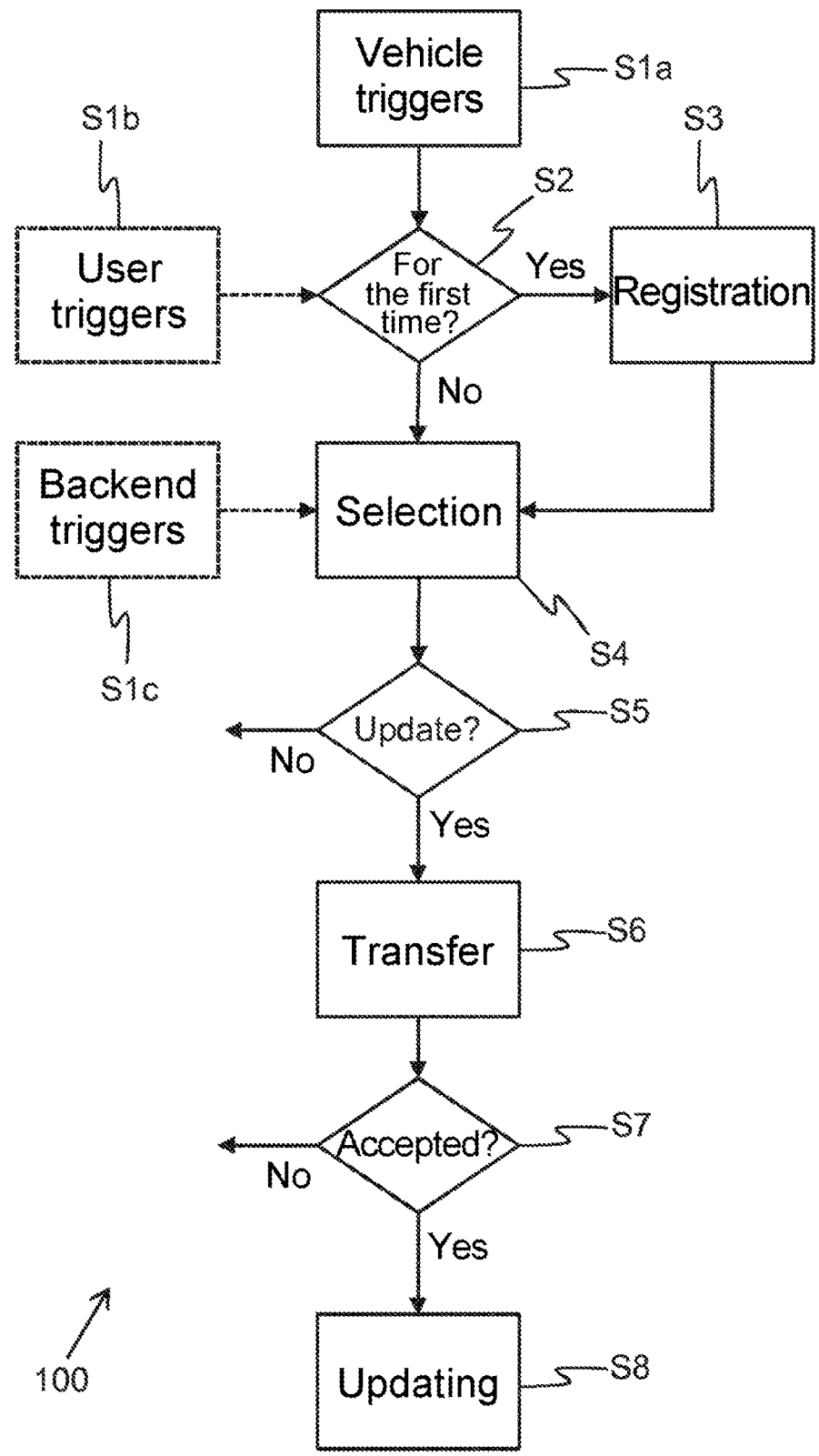
FIG. 1 shows at least partly schematically an embodiment of a method according to the invention.

FIG. 1 shows an exemplary embodiment of a method 100 for updating the software of a plurality of vehicles of a vehicle fleet. The method starts with step S1a, in which at least one vehicle of the vehicle fleet generates a trigger signal that is suitable for triggering an update of the software of the vehicle, in particular by means of a central data processing device, and transmits the trigger signal to the central data processing device, e.g. via an air interface. The trigger signal is preferably generated regularly, for example at predetermined times or at predetermined intervals, for example on the first day of each month or every 30 days, so that an update of the software of the vehicle is essentially possible at any time. In this case, the time of first generation and/or transmission to the central data processing device is preferably chosen randomly, so that an essentially uniform load distribution with respect to the data transmission is possible.

The central data processing device preferably continuously checks whether a trigger signal is present or is input, in particular via the air interface. If this is the case, the central data processing device can check in a further step S2 whether the trigger signal was generated for the first time or whether the vehicle has connected to the central data processing device for the first time. If this is the case, the vehicle is registered in the central data processing device in a further step S3. Preferably, the trigger signal contains vehicle identification data of the vehicle that are suitable for the identification of the vehicle and that are stored by the central data processing device for the purpose of registration, for example in a database unit.

In addition, software information that is suitable to identify the software of the vehicle that is currently being used may be transmitted from the vehicle via the air interface to the central data processing device and advantageously stored together with the vehicle identification data, for example in the database unit, in particular when the vehicle connects to the central data processing device for the first time. As a result, it is essentially possible to obtain information on the software versions of the vehicles of the vehicle fleet at any time on the basis of the registration of the vehicles in the central data processing device.

After registration in step S3, or if the check in step S2 shows that the vehicle is already registered, in a further step S4 the vehicle is selected as the recipient of the software update, so that the software update can be advantageously transferred from the central data processing device to the vehicle via the air interface in the further course of the method 100 in response to the generation of the request signal in step S1a. Preferably, when selecting the vehicle from the vehicles of the vehicle fleet registered in the central data processing device, in particular on the basis of the vehicle identification data preferably contained in the trigger signal, the software information associated with the selected vehicle identification data is also determined from the central data processing device.

In this way, in a further step S5 it can be determined whether an up-to-date software update for the vehicle that sent the trigger signal is available, i.e. whether the currently used software of the vehicle can be advantageously augmented, at least partially replaced or corrected. This check may be carried out, for example, on the basis of a comparison of current software present in the central data processing device with the software information, so that a reliable determination is made as to whether the software of the vehicle that is currently in use can be updated.

If there is no current software update in the central data processing device, the method 100 ends. Otherwise, the method continues with the next step S6, in which the current software update to update the software of the vehicle that is currently in use is transmitted from the central data processing device to the vehicle via the air interface.

In a further step S7, it is determined whether a user of the vehicle selected in step S4 has consented to the update of the currently used software of his vehicle by the current software update. For example, the user may be asked if he agrees to the software update. If he answers this with "yes", it can be carried out in the next step S8. Preferably, the previously used software of the vehicle is augmented or at least partly replaced or changed in such a way that new vehicle functions of the vehicle are provided or already existing vehicle functions are improved. Otherwise, the method 100 ends.

In a variation of the exemplary embodiment described above it is also possible that the trigger signal is generated by the user of the vehicle in a step S1b, in particular using a data processing device, in particular by means of a mobile device, a computer, or a laptop. It is contemplated, for example, that the user can determine a software configuration of his vehicle, in particular available vehicle functions, via an application of the vehicle manufacturer, such as a web portal, whereupon a corresponding trigger signal will be generated and preferably transmitted to the central data processing device.

In a further modification of the exemplary embodiment, it is also possible that the trigger signal is generated by the central data processing device in a step S1c, for example when a new software update is provided by the vehicle manufacturer. In this case, the vehicle, and where appropriate a plurality of vehicles, may be selected from the vehicles of the vehicle fleet registered in the central data processing device in a preferential manner according to predetermined criteria, such as on the basis of a selection algorithm capable of optimizing a load distribution relating to the connections between the vehicles of the vehicle fleet and the central data processing device or to the central data processing device itself.

Figure 2:
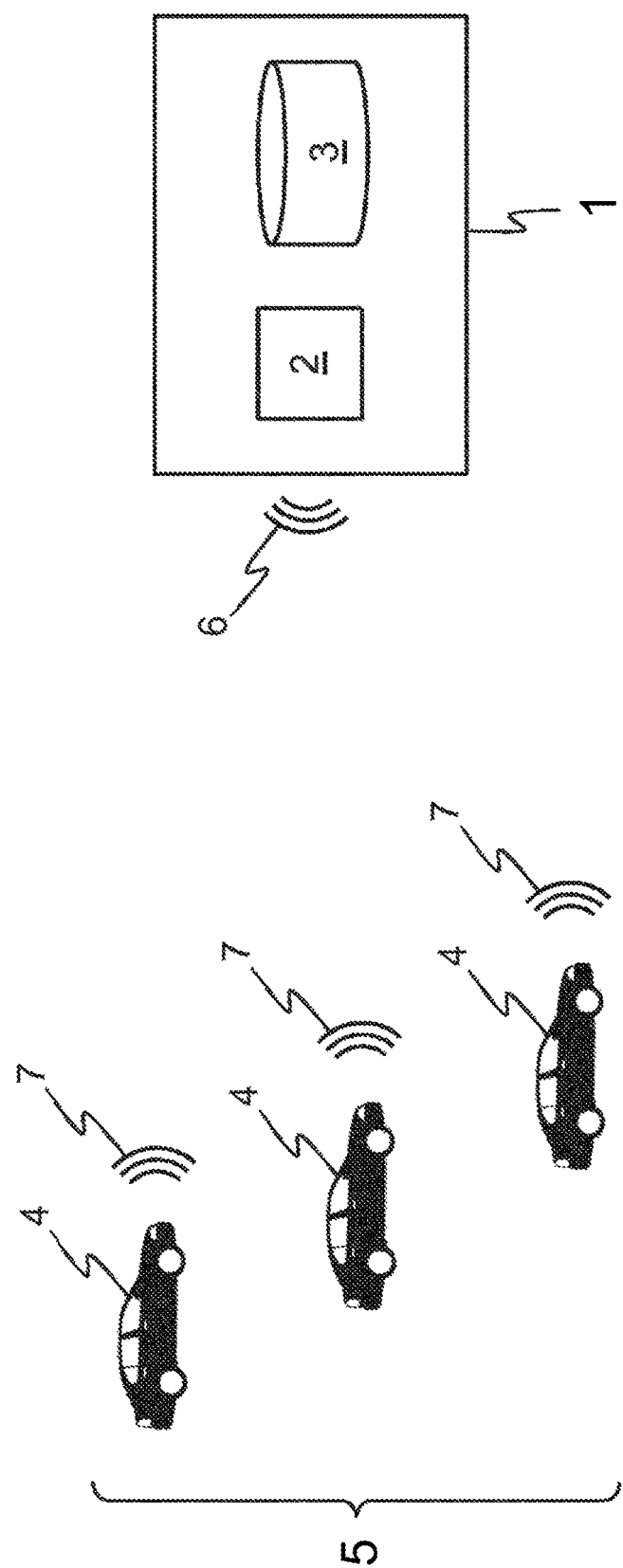
FIG. 2 shows at least partly schematically an embodiment of a central data processing device according to the invention.

In FIG. 2, an exemplary embodiment of a central data processing device 1 with a computing unit 2 and a database unit 3 is shown. The central data processing device 1 is preferably set up to establish a connection for data communication to vehicles 4 of a vehicle fleet 5, in particular via an air interface 6, and on the first connection to receive vehicle identification data of the vehicles 4 and store them in the database unit 3.

Each of the vehicles 4 is preferably set up to generate a trigger signal 7, in particular automatically, that is suitable to initiate an update of the software that is currently being used of the respective vehicle 4. By processing data and/or signals received via the air interface 6 by means of the computing device 2, the central data processing device 1 can essentially continuously check whether a trigger signal 7 is present or has been received.

On the basis of a trigger signal 7 that is present, the computing unit 2 selects the corresponding vehicle 4 from all vehicles 4 of the vehicle fleet 5 registered in the central data processing device 1 on the basis of the vehicle identification data stored in the database unit 3. Preferably, the computing unit 2 of the database unit 3 also extracts software information that is suitable to determine whether the selected vehicle 4 has the most up-to-date available software, for example whether a software update with the latest available software has already been performed in relation to the selected vehicle 4.

If the computing unit 2 determines that an update of the software of the selected vehicle 4 is possible, the central data processing device 1 transmits the software update via the air interface 6 to the selected vehicle 4 of the vehicle fleet 5. A query can then be made to a user of the vehicle 4 as to whether he agrees to the update the software. If this is the case, the software update will be performed.

LIST OF REFERENCE SIGNS

1 Central data processing device
2 Computing Unit
3 Database unit
4 Vehicle
5 Vehicle fleet
6 Air interface
7 Trigger signal
100 Method
S1 to S8 Steps of the method The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for updating software in a plurality of vehicles of a fleet of vehicles during a software rollout, the method comprising the steps of:

registering vehicles of the vehicle fleet in a central data processing device by receiving vehicle identification data of the vehicles transmitted via an air interface to the central data processing device when a vehicle connects to the central data processing device for the first time;

continuously checking whether a trigger signal is present that is capable of triggering an update of the software in at least one of the plurality of vehicles of the vehicle fleet;

selecting at least one vehicle registered in the central data processing device from the plurality of vehicles of the vehicle fleet on the basis of the vehicle identification data received by the central data processing device when a trigger signal is detected and a software update is available; and transferring the software update from the central data processing device to the selected vehicle via the air interface, wherein the trigger signal generated by a vehicle of the vehicle fleet is generated for a first time at a randomly determined time within a specified period of time.

2. The method according to claim 1, further comprising the step of:

checking whether a user of at least one selected vehicle has consented to the software update, wherein, if there is consent, the software update is transmitted from the central data processing device to the at least one selected vehicle via the air interface and/or the software of at least one selected vehicle is updated by the transmitted software update.

3. The method according to claim 2, wherein if a user of the selected vehicle has not given consent to the software update, in the future no further trigger signals will be generated and/or the selected vehicle will no longer be selected, at least until there is another software update.

4. The method according to claim 1, wherein the trigger signal is generated at regular intervals by each vehicle of the vehicle fleet and is suitable to identify the respective vehicle.

5. The method according to claim 1, wherein the at least one vehicle of the vehicle fleet is registered in the central data processing device on the basis of the respective trigger signal generated for the first time by the at least one vehicle.

6. The method according to claim 1, wherein the generation of the trigger signal is caused by a user of a vehicle of the vehicle fleet.

7. The method according to claim 6, wherein the vehicle of the user causing the generation of the trigger signal is selected from the vehicles registered in the central data processing device, and the transmission of software updates from the central data processing device to other vehicles of the vehicle fleet is deferred until after the transfer of the software update from the central data processing device to the selected vehicle of the user.

8. The method according to claim 1, further comprising the step of:

checking whether the update of the software was successfully carried out by the transmitted software update, wherein no further trigger signal is generated and/or the selected vehicle will not be selected in the future if the update has not been successful, at least until the software update is completed.

9. The method according to claim 1, wherein the vehicles are motor vehicles.

10. A device for updating software in a plurality of vehicles of a fleet of vehicles during a software rollout, comprising:

a central data processing device configured to:

register vehicles of the vehicle fleet by receiving vehicle identification data of the vehicles via an air interface to the central data processing device when a vehicle communicates with the central data processing device for the first time;

continuously check whether a trigger signal is present that is capable of triggering an update of the software in at least one of the plurality of vehicles of the vehicle fleet;

select at least one vehicle registered in the central data processing device from the plurality of vehicles of the vehicle fleet on the basis of vehicle identification data received by the central data processing device when a trigger signal is detected and a software update is available; and transfer the software update from the central data processing device to the selected vehicle via the air interface, wherein the trigger signal generated by a vehicle of the vehicle fleet is generated for a first time at a randomly determined time within a specified period of time.

11. A vehicle, comprising:

a software update trigger signal generator that generates a trigger signal to initiate an update of software of the vehicle, the trigger signal being transmitted via an air interface to a central data processing device, wherein the vehicle is one of a plurality of vehicles of a fleet of vehicles, and the central data processing device is configured to:

register vehicles of the vehicle fleet by receiving vehicle identification data of the vehicles via an air interface to the central data processing device when a vehicle communicates with the central data processing device for the first time;

continuously check whether a trigger signal is present that is capable of triggering an update of the software in at least one of the plurality of vehicles of the vehicle fleet;

select at least one vehicle registered in the central data processing device from the plurality of vehicles of the vehicle fleet on the basis of vehicle identification data received by the central data processing device when a trigger signal is detected and a software update is available; and transfer the software update from the central data processing device to the selected vehicle via the air interface, wherein the trigger signal generated by a vehicle of the vehicle fleet is generated for a first time at a randomly determined time within a specified period of time.

* * * * *